No. 691,748. Patented Jan. 28, 1902.
C. COLAHAN.
CORN HARVESTER.
(Application filed Oct. 13, 1900.)
(No Model.) 2 Sheets—Sheet 1.
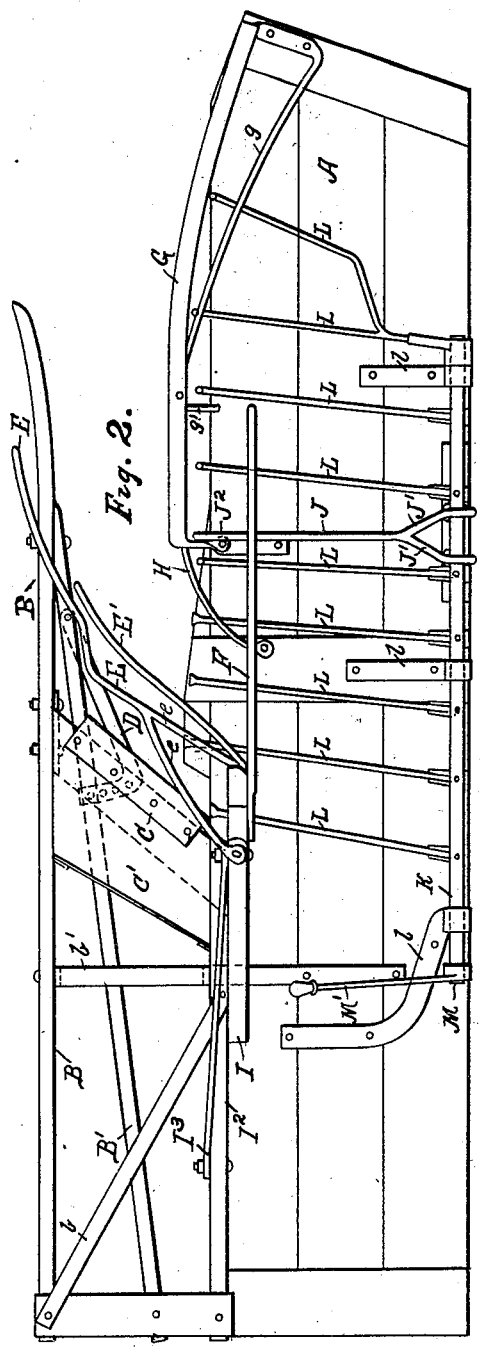
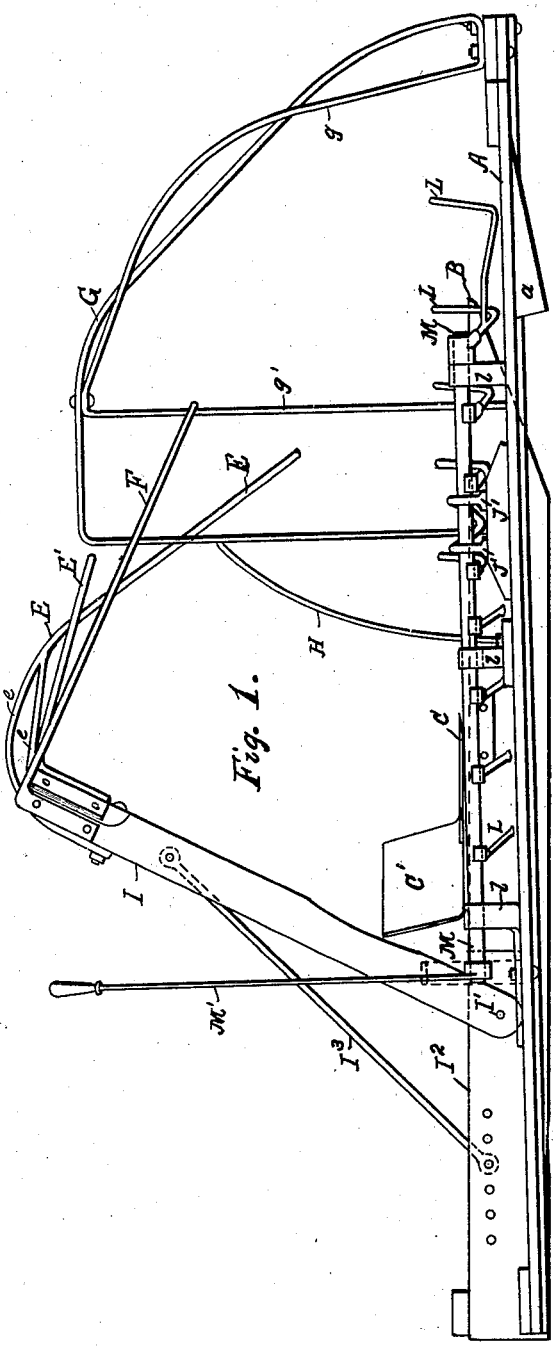
Witnesses:
M. H. Colahan
Laura H. Osterman
Inventor.
Chas. Colahan No. 691,748. Patented Jan. 28, 1902.
C. COLAHAN.
CORN HARVESTER.
(Application filed Oct. 13, 1900.)
(No Model.) 2 Sheets—Sheet 2.
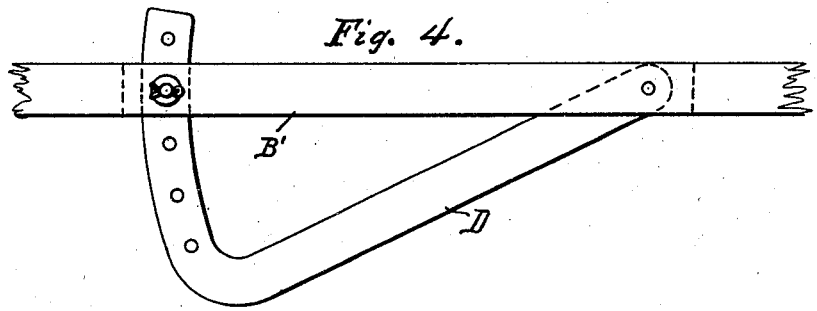
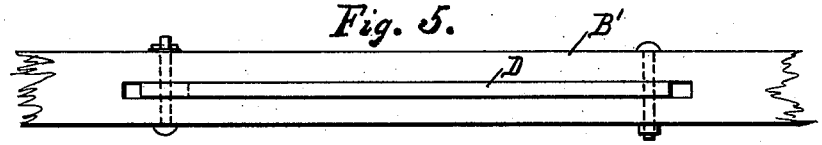
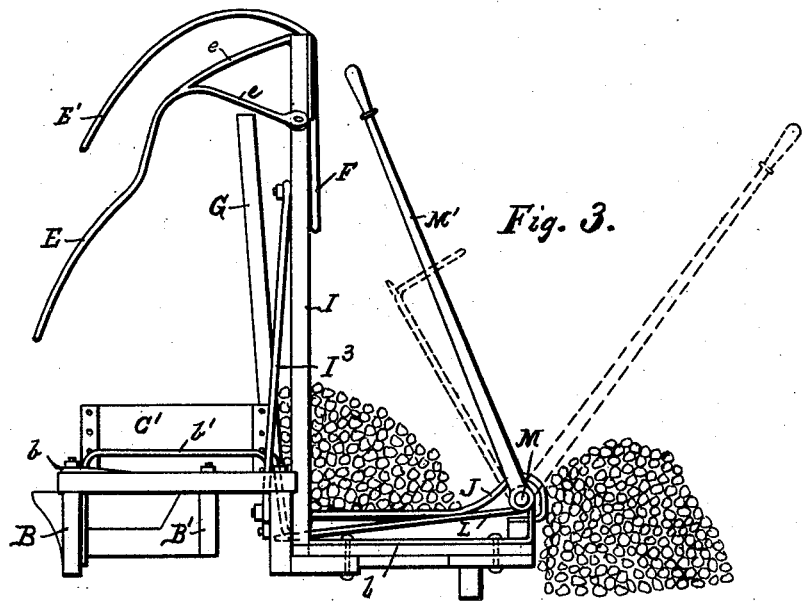
Witnesses:
M. H. Colahan
L. H. Osterman.
Inventor.
Chas. Colahan

UNITED STATES PATENT OFFICE.

CHARLES COLAHAN, OF CHICAGO, ILLINOIS.

CORN-HARVESTER.

SPECIFICATION forming part of Letters Patent No. 691,748, dated January 28, 1902.

Application filed October 13, 1900. Serial No. 33,018. (No model.)

*To all whom it may concern:*

Be it known that I, CHARLES COLAHAN, a citizen of the United States, and a resident of the city of Chicago, in the county of Cook and State of Illinois, have invented certain new and useful Improvements in Corn-Harvesters, of which the following is a specification, reference being had to the accompanying drawings.

My invention relates to corn-harvesters or machines for cutting standing corn in the field and the devices that cause the stalks after being cut to fall, the tops forward, and be deposited lengthwise in the bundling-receptacle in a line parallel with the direction of the travel of the machine, and when the desired quantity for a bundle is so deposited the receptacle is caused to rise and discharge the same upon the ground at regular intervals to be placed in the shock, and I will proceed to more fully describe in detail the construction and operation of my invention.

In the drawings, Figure 1 is a side elevation; Fig. 2, a plan view; Fig. 3, an end view, and Figs. 4 and 5 enlarged sectional views of the adjustable guide to regulate the passageway to the knife.

The letters attached to the drawings indicate the various parts referred to in the specification.

A is the main platform, that advances on one side of the row of corn, and $b$ and $b'$ brace-arms thereon. B is the outer guide-arm, that advances on the other side of the row of corn and being near the ground at the forward point will pass under any fallen stalks and cause them to straighten up, while the compressing supplemental guide-arm B' will direct the stalks toward the knife C. This latter arm is provided with an adjustable elbow-shaped guide-finger D on a plane parallel with the knife, but below the cutting edge, pivoted near the front, and adjustably secured at the rear to enlarge or decrease the space or throat-way through which the corn passes to the knife, and said throatway may be adjusted to any desired capacity for large or small hills or drill-planted rows of corn and may be swung back to open the entire space in cutting sowed-corn fodder.

C' is a vertical stop to arrest and guide the butts of the stalks inwardly after being cut, which may be adjustable, if desired.

E is a bifurcated outwardly-extended stalk-guiding rod extending from the adjustable post downwardly to gather the stalks on the outer side. $e\ e$ are supplemental securing and bracing arms formed integral therewith.

E' is a supplemental guiding-rod for use in very tall corn to aid in inclining it forward into the receptacle.

F is a guiding stop-rod for directing the tops of the corn as the stalks fall into the receptacle.

G is a guiding-rod forming one side of the receptacle.

$g\ g'$ are supplemental guiding-rods.

H is the inwardly-inclined butt-guiding rod, secured centrally to the platform about midway between the butt and middle portion of the bundle.

J is a horizontal transverse raised bar secured centrally to and extending across the platform of receptacle, it and the platform being entirely free from any vertical stalk-controlling arms, and thus serve to support the stalks centrally and aid in their lateral adjustment during the formation of the bundle. J' and $J^2$ are its raised supporting-arms.

I is the forwardly-inclined adjustable post for supporting the stalk-guiding rods. It is important that this post be secured to the inner or stubble side of the platform to prevent liability of obstruction from grass and vines common to corn-fields and that the outer guide-arm B shall be entirely free and unobstructed to prevent clogging of the machine in its progress.

L L are the inwardly-projecting teeth of the tilting bundle-receptacle; M, its vibrating shaft; M', its actuating-lever, and $l\ l\ l$ its upwardly-projecting journal-bearing supports secured to the platform by means of bolts.

The object of my invention is to provide an inexpensive corn-harvester that can be drawn by one horse. The driver standing upon the platform at the rear, the machine is advanced on the row of corn, and the stalks are supported on either side between the guide-rods, which also crowd the top of the stalks forward and downward, at which time the hill is reached by the knife. The tops of the stalks being inclined forward and also toward the platform side of the machine are thus readily severed at the butts by the knife, upon which they are received as they are cut, and the weight of the ears and stalks will cause them to fall forward head first into the receiver or platform upon the cross-bar J. The butts being forced around by the rod H, the stalk will swing centrally as the middle of its length rests upon the cross-bar J and will be thereby adjusted parallel with the length of the platform.

The stalk-guiding rods are supported above the platform by means of the adjustable post I, which is pivoted at I' to the lateral bar I², that is secured to the platform A on the stubble side and provided with adjustment-holes for changing the position of the lower end of the rod I³, that maintains the adjustable post I, to any desired position to accommodate varying conditions of length of corn.

The tilting bundling-receptacle consists of a vibrating shaft K, secured at the outer side of the platform in raised journal-bearings at sufficient height to place the outgoing bundle beyond the stubble, where it is dropped. This shaft is caused to vibrate by means of a lever M', actuated by the driver, and inwardly-projecting teeth L are secured to this shaft and lie on the platform to receive the incoming stalks as they are cut and directed thereto by the guiding-rods F and H, as heretofore stated, and the oblique upwardly-projecting teeth L are provided at the front with upwardly-extended points to insure the withdrawal of the cornstalk from the receptacle as it is tilted to throw the bundle outwardly over the stubble of the former cut row. The central supporting-rod J upon the platform rises above the bundle-supporting teeth L.

Having thus described my invention, what I claim, and desire to secure by Letters Patent, is—

1. In a corn-harvester the combination of a stalk-receptacle lying parallel with the row of corn, the outwardly-extending stalk-gathering rod E, the forwardly-inclined adjustable post I, the guiding stop-rod F, the rods E, F, being supported by the post I and the inclined post I being pivoted at I' to the platform-bar I² and the rod I³ holding the post for various positions of adjustment, substantially as shown and described.

2. In a corn-harvester the combination with the knife C and stalk-receptacle of the horizontal stalk-supporting bar J extending the entire width of the platform forward of the knife, and the outwardly and upwardly extending butt-guiding rod H secured at its lower end centrally to the platform at some distance from the corn-passage and intermediate between the knife and the cross-bar J, to direct and guide the lower ends of the stalks inwardly to the center of the platform, and prevent obstruction of the knife, substantially as shown and described.

3. In a platform corn-harvester, the combination of the stalk-guiding rods with the bundle-receptacle and the transverse stalk-supporting bar J near the bottom of the receptacle, its upper surface being straight and also parallel with and extending the entire width of the platform, and the butt-guiding rod H, operating substantially as shown and described.

4. In combination with the knife C, and the stalk-guiding arms B B', the adjustable elbow-shaped guide-finger D pivoted to the arm B' at its front end, at a point forward of the knife, and extending beneath the same rearwardly below the cutting edge of the knife and provided with means of adjustment to admit the entire or partial opening of the throatway, substantially as shown and described.

5. In a corn-harvester a stalk-supporting platform A, combined with the horizontal transverse, raised, central stalk-supporting bar J extending the entire width of the platform and supporting the stalks above the bundle-carrier, the actuating-shaft of the bundle-carrier secured at the outer side of the platform at a point near to and above the stubble of the former cut row of corn, its actuating-lever M' attached at the rear of the shaft within reach of the driver for raising the stalks from the supporting-finger J and discharging the bundle outwardly over the stubble substantially as shown and described.

6. In a corn-harvester the tilting bundle-receptacle and the horizontal transverse raised central stalk-supporting bar J upon which the incoming stalks pivotally adjust themselves parallel with the length of the bundle, combined with the guiding-rod G, the outwardly and upwardly inclined guiding-rod H, secured centrally to the platform operating substantially as shown and described.

CHARLES COLAHAN.

Witnesses:
M. H. COLAHAN,
LAURA H. OSTERMAN.